United States Patent [19]
Tague

[11] 3,818,599
[45] June 25, 1974

[54] VISUAL GUIDE MEANS FOR BALL AND SOCKET ALIGNMENT DURING AN AUTOMOTIVE TRAILER COUPLING OPERATION

[76] Inventor: Robert J. Tague, Wonder Lake, Ill. 60097

[22] Filed: Sept. 25, 1972

[21] Appl. No.: 291,609

[52] U.S. Cl. .................................. 33/264, 280/477
[51] Int. Cl. ........................... G01c 5/00, B60d 1/06
[58] Field of Search ...................... 33/264; 280/477

[56] References Cited
UNITED STATES PATENTS

| | | | |
|---|---|---|---|
| 1,801,469 | 4/1931 | Wagner | 33/264 |
| 2,046,581 | 7/1936 | Reeves | 33/264 |
| 2,815,732 | 12/1957 | Majors | 33/264 |
| 3,015,162 | 1/1962 | Bohnet | 33/264 |
| 3,159,917 | 12/1964 | Whitehead | 33/264 |

Primary Examiner—Louis R. Prince
Assistant Examiner—Richard R. Stearns
Attorney, Agent, or Firm—Norman H. Gerlach

[57] ABSTRACT

A sighting device consisting of two similar components which, when operatively applied, respectively, to the socket-carrying hitch arm of a trailer or other vehicle to be towed and the ball-carrying hitch arm of an automobile or other towing vehicle present sighting indicia or elements which are disposed at the same level above the ground and establish a plumb line which passes through the centers of the socket and ball of the coupling between the trailer and the automobile so that when a driver maneuvers the automobile in such a manner that the sighting elements contact each other, the socket and ball are in vertical alignment for hook-up or coupling purposes.

2 Claims, 6 Drawing Figures

PATENTED JUN 25 1974 3,818,599

VISUAL GUIDE MEANS FOR BALL AND SOCKET ALIGNMENT DURING AN AUTOMOTIVE TRAILER COUPLING OPERATION

The present invention relates generally to visual guide means whereby hook-up operations between a trailer or other vehicle to be towed and its towing automobile or other vehicle may be facilitated. More specifically, the invention is concerned with a sighting device which, when operatively applied to the trailer and its associated towing automobile, will enable the driver of the automobile to manipulate the automobile in a backward direction and, by viewing the sighting device, properly juxtaposition the automobile with respect to the trailer in such a manner that the ball hitch element which is associated with the towing automobile directly underlies the socket hitch element which is associated with the towing automobile directly underlies the socket hitch element which is associated with the trailer, the actual coupling operation being effected by lowering the forward end of the trailer after the trailer and automobile are thus juxtapositioned.

Heretofore, the operation of effecting a hook-up between an automobile or other automotive vehicle and a trailer by means of a ball and socket type hitch arrangement has proven difficult, especially to a person who has not yet acquired a considerable degree of skill in handling an automobile-trailer combination, and more especially when the operation is performed single-handedly. Even with a thoroughly skilled driver, it is necessary that such driver makes an initial estimate of the intended proper position of the towing automobile and then enter the latter and make a blind maneuver in the hope that the automobile will ultimately be driven into a proper coupling position. This is because the coupling hitch of the trailer ordinarily is not visible to the driver of the automobile, except at great distances, when the driver is seated in the driver's seat of the automobile. If such a first attempt does not produce the desired results, the driver must get out of the automobile and make a second estimate of his position with respect to the trailer and then, after again getting back into the automobile, perform another maneuver. Even when the towing automobile is in the form of a station wagon where the rear door of the body may be let down or swung to one side for purposes of visibility, difficulty is encountered near the final stages of maneuvering since close proximity of the two vehicles usually blocks a full view of the coupling hitch on the vehicle to be towed (trailer) or, alternatively, the open rear door interferes with final movement of said vehicle.

In thus attempting to couple the two vehicles (trailer and automobile), the driver the automobile must take into consideration both longitudinal and lateral hitch alignment. If, during an initial backward movement of the automobile, lateral alignment is not attained because the driver overshoots his mark, collision between the two vehicles and consequent damage to one or the other or both may take place. If lateral alignment is not attained during such backward initial automobile movement, the driver must move the automobile forwardly and make a second attempt for proper alignment. An alternative is for the driver to stop his automobile at a point where only approximate contiguity of the ball and socket has been attained, and then dismount and manually lift the front end of the trailer and set the socket over the ball. This frequently requires considerable strength unless the trailer hitch component is equipped with rolling tractional support and, even when such tractional support is available, it is frequently difficult to roll the trailer from its static position on the ground.

The present invention is designed to overcome the above-noted limitations that are attendant upon the coupling of an automotive towing vehicle and its associated trailer or other vehicle to be towed and, toward this end, the invention contemplates the provision of a sighting device which embodies two similar components which, when operatively applied to the socket-carrying hitch arm of the trailer and the ball-carrying hitch arm of the automobile, afford or establish counterpart sighting indicia or elements which assume the same level above the ground. Since the sighting element on the trailer is fixed while the sighting element on the automobile is movable, the driver of the latter vehicle may, by viewing both elements, either directly or through his rear vision mirror, maintain the two sighting elements in longitudinal or lateral alignment while at the same time causing the automobile to move backwardly until the two elements move into contact with each other.

The provision of a visual guide means such as has briefly been outlined above and possessing the stated advantages, constitutes the principal object of the present invention.

A further and more specific object of the invention is to provide substantially identical vehicle attachments or components for the purposes set forth above and wherein each component is comprised of a base which is capable of being placed upon the hitch arm of either the towing or the towed vehicle and, when so placed, is fixedly held thereon by magnetic attraction. Pivoted to such base is the proximate lower end of an extensible and contractible supporting arm consisting of telescopic sections similar to those associated with an automotive radio antenna, while the distal or upper end of such arm carries one of the aforementioned sighting indicia or elements. Thus, by a combination of lengthening or shortening and also inclining the supporting arms after the bases have been respectively applied to the hitch arms of the two vehicles, the sighting element may be brought to the same elevation above the ground and into vertical plumb line register or alignment with the ball and socket hitch members or elements of the automobile and trailer hitch arms respectively, after which the automobile may be operated in a backward direction in the manner previously described to bring the two sighting elements into contiguity.

In one form of the invention, the sighting elements at the distal ends of the telescopic supporting arms are in the form of small balls or nodules such as are conventionally carried at the distal ends of radio antennas, while in a modified form of the invention, one such sighting element is in the form of a forward gun sight while the other sighting element is in the form of a cooperating rear gun sight. In this latter form of the invention, the driver of the automobile will maintain these gun-type sights in visual register during backward motion of the automobile in precisely the manner in which a gun is aimed at a target.

The provision of a visual guide means which is comprised of two substantially identical or closely similar components and, therefore, results in a reduction in tooling costs in the manufacture thereof; one in which such duplication of components enables either component to be applied to either the towing or the towed vehicle so as to avoid the need for distinguishment during installation thereof on the vehicles; one in which each component is comprised largely of commercially available parts or assemblies so that special manufacturing operations are reduced to a minimum; one in which each component is extremely simple in its construction and is comprised of relatively few parts, thereby further contributing to low cost of manufacture; one in which the components are capable of being nested together and stored in a relatively small space for transportation purposes; one in which such components are rugged and durable and are thus unlikely to get out of order; and one which, otherwise, is well-adapted to perform the services required of it, are further desirable features which have been borne in mind in the production and development of the present invention.

Other objects and advantages of the invention, not at this time enumerated, will readily suggest themselves as the following description ensues.

The invention consists in the several novel features which are hereinafter set forth and are moe particularly defined by the claims at the conclusion hereof.

In the accompanying single sheet of drawings forming a part of this specification, two illustrative embodiments of the invention are shown.

Figure 3:
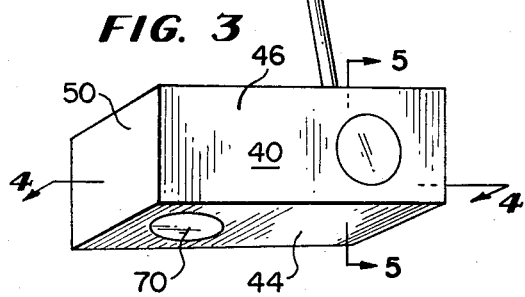
FIG. 3 is a bottom perspective view of one of the two identical sighting components which are employed in connection with the present invention.
Figure 5:
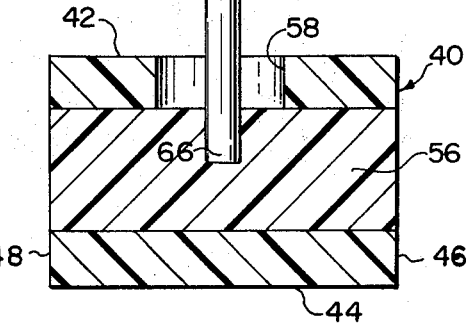
Figure 6:
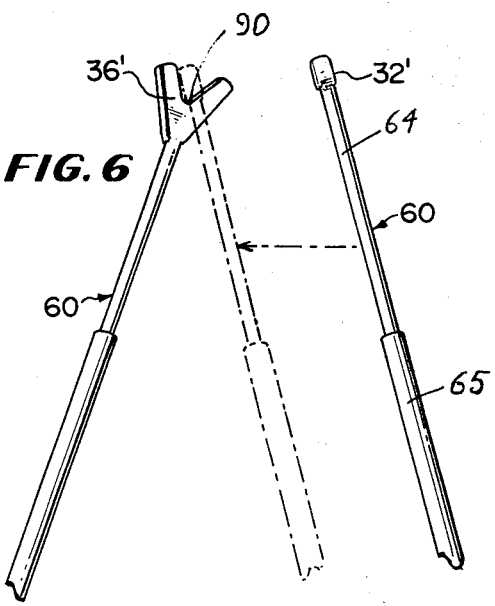

FIG. 5 is a sectional view taken on the horizontal plane indicated by the line 5—5 of FIG. 3 and in the direction of the arrows; and FIG. 6 is a fragmentary perspective view of a pair of sighting indicia or elements which are employed in connection with a modified form of the invention, such view illustrating, schematically, the relative positions of the elements during sighting operations preparatory to coupling of the two associated vehicles.

Figure 1:
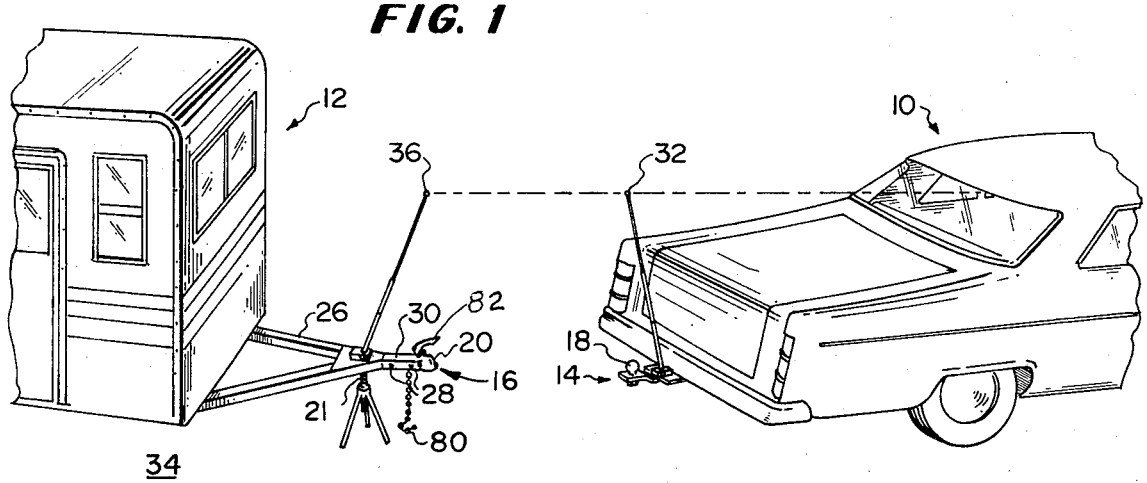
FIG. 1 is a fragmentary perspective view of an automotive towing vehicle (automobile) and an associated trailer having operatively installed thereon the visual guide means of the present invention, the disclosure illustrating schematically the manner in which coupling thereof is facilitated by such guide means.
Figure 2:
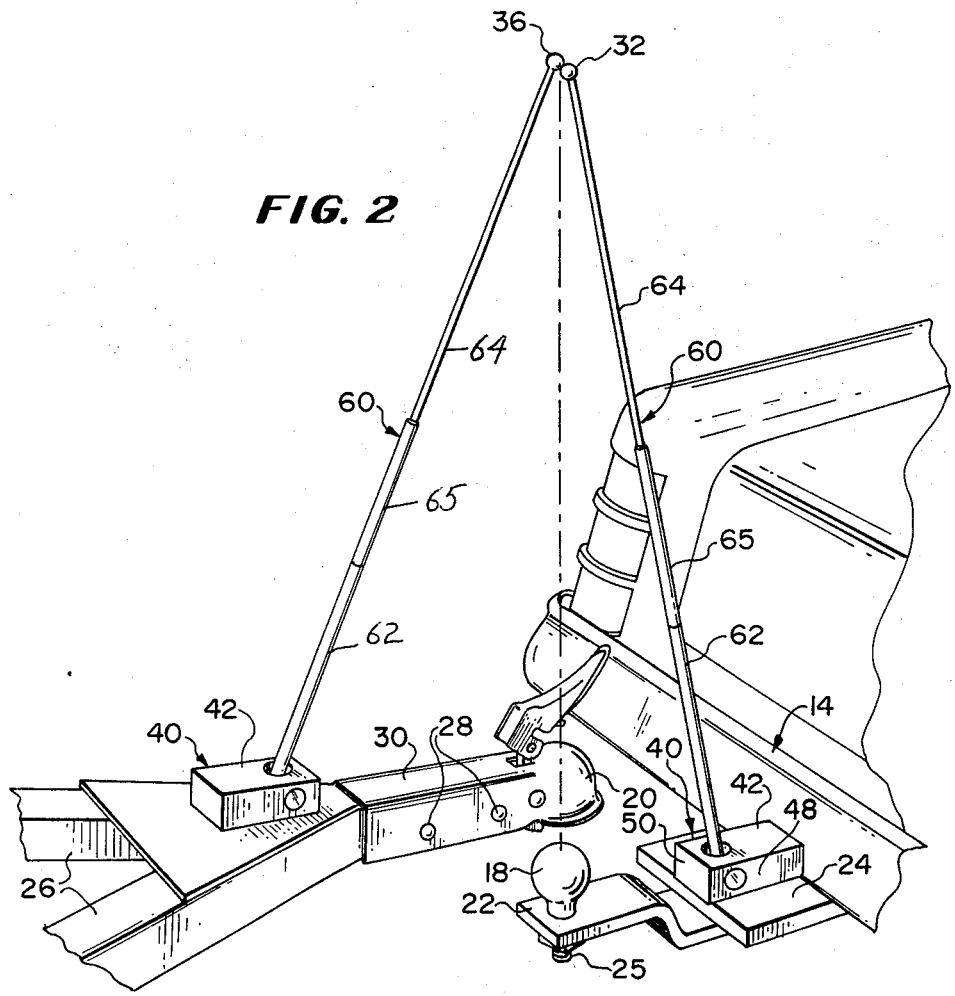
FIG. 2 is an enlarged fragmentary perspective view of the counterpart hitch arms of the automobile and trailer with the guide means mounted thereon, such view illustrating schematically the position assumed when ultimate ball and socket alignment is attained.

Referring now to the drawings in detail and in particular to FIGS. 1 and 2, an automotive vehicle in the form of a passenger automobile is fragmentarily shown and is designated in its entirety by the reference numeral 10. A trailer-type vehicle is similarly represented and designated by the reference numeral 12. The automobile 10 is provided with a conventional ball hitch assembly 14 which may be welded to the rear end of its chassis, while the front end of the trailer 12 is provided with a conventional mating socket hitch assembly 16. The ball hitch assembly 14 includes a coupling ball 18, while the socket hitch assembly 16 includes a cooperating coupling socket 20.

The towing automobile 10 and the trailer 12 to be towed are shown in FIG. 1 in positions which they may assume immediately prior to bringing them into proper juxtaposition for coupling purposes. Accordingly, the trailer 12 has its front end supported by a worm or other type of jack 21 which is so adjusted that the coupling socket 20 of the socket hitch assembly 16 is maintained at an elevation which is somewhat higher than the normal elevation of the coupling ball 18 of the ball hitch assembly 14 on the automobile 10. In order to couple the two vehicles (automobile 10 and trailer 12) properly, it is customary for the driver of the automobile carefully to move the automobile rearwardly in an effort to bring the ball 18 and the socket 20 into vertical alignment as shown in FIG. 2, after which release of the jack 20 will allow the trailer to tilt forwardly, thus lowering the socket 20 over, and into interlocking or coupling relation with, the ball 18.

As previously stated, the ball hitch assembly 14 and the socket hitch assembly 16 are conventional assemblies and the illustrated assemblies are merely exemplary of two such hitch arrangements which, when coupled together, will effectively connect the automobile 10 to the trailer 12 for trailer towing purposes. The ball hitch ssembly 1 is in the form of a shelf-like bracket plate 24 (see FIG. 2) from which there projects rearwardly a ball-carrying arm 22, the ball 18 being fixedly attached to such arm by way of bolts 25. The socket hitch assembly 16 is in the form of a yoke 26 on the forward end of which there is attached by bolts 28 an inverted channel-shaped socket-forming member 30. The extreme forward end of such member is shaped to define the socket 20 in a manner well understood in the art.

According to the present invention, in order to facilitate the automobile driving operations which are requisite to attaining proper juxtapositioning of the automobile with respect to the trailer, means are provided for fixedly positioning a first sighting element 32 directly above, i.e., in vertical alignment with, the coupling ball 18 on the automobile and at a predetermined vertical distance above the ground 34 on which the two vehicles 10 and 12 are supported. Additionally, means are provided for similarly fixedly positioning a second sighting element 36 directly above the coupling socket 20 of the socket assembly 16 on the trailer 12 and at the same predetermined elevation above the ground 34 as that of the first sighting element. Since the sighting element 32 is fixed with respect to the stationary trailer 12 and since the sighting element 36 moves with the automobile 10, it is apparent that the driver of the automobile may utilize the two sighting elements 32 and 36 to assist him visually in guiding the automobile into proper juxtaposition with respect to the trailer by the simple expedient of sighting the two elements by means of his rear vision mirror as indicated by the dotted line in FIG. 1 of the drawings. After sighting both elements 32 and 36, the driver will maneuver the automobile 10 so as to bring both elements 32 and 36 into register with the line of sight, after which it is merely necessary for him to cause the automobile to move rearwardly while at the same time operating the steering wheel in such a manner as to preserve such sight register of the two elements 32 and 36 or to restore such sight register after any slight deviation thereof takes place. Continued rearward movement of the automobile will eventually, if such sight register is preserved, cause the traveling sighting element 32 actually to engage the fixed sighting element 36, at which time the driver will stop the automobile. Since both sighting elements are in precise vertical alignment with their respective coupling members, it follows that when the two sighting elements 32 and 36 are in contact with each other, the coupling members 18 and 20 will be in vertical register with one another.

According to the invention, an extremely simple and identical means is provided whereby each of the two sighting elements 32 and 36 may be properly positioned on its associated vehicle. Since these means are identical, a description of one of them will suffice for the other.

Figure 4:
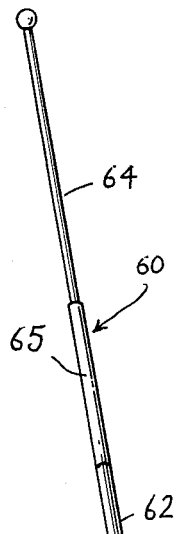
FIG. 4 is a sectional view taken on the horizontal plane indicated by the line 4—4 of FIG. 3 and in the direction of the arrows.
Figure 4:
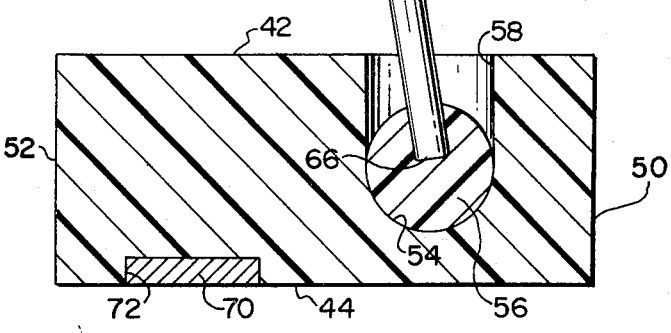

The mounting means for each sighting element comprises a rectangular block-like base 40 which ma be formed of any suitable material such as wood, plastic, or metal, and presents planar top and bottom faces 42 and 44, side faces 46 and 48, and end faces 50 and 52. A transverse bore 54 extends completely and horizontally through the base and opens at its ends in the block side faces 46 and 48. Rotatably disposed within the bore 54 with a yieldable friction fit is a dowel-like rock shaft 56, the opposite ends of which lie flush with said side faces 46 and 48. A limited central region of the shaft 56 is exposed through the top face 42 by reason of a vertical bore 58 which intersects the central portion of the bore 54. The rock shaft 56 has anchored thereto the proximate end of a composite telescopic supporting rod 60 which consists of two or more telescopically related rod sections, three such sections being disclosed herein and consisting of a proximate section 62, a distal section 64, and an intermediate section 65. The proximate section is tubular and receives telescopically the intermediate section 65 therein. Said intermediate section is tubular and receives telescopically the distal section 64 which is preferably solid. The lower end of the proximate section 62 projects into a small socket 66 which is formed medially of the shaft 56. As shown best in FIGS. 4 and 5, this section projects upwardly and outwardly of the bore 58 in the base 40. The extreme upper end of the distal rod section 64 has mounted thereon one of the two sighting elements 32 or 36, such element being in the form of a small diameter ball cap. The diameter of the proximate rod section 62 is appreciably smaller than the diameter of the bore 58 and, thus, the supporting rod 60 as a whole may be swung or tilted about the horizontal axis of the rock shaft 56 and in the central vertical longitudinal plane of the base 40 throughout a relatively large angle.

The block-like base 40 is adapted to be fixedly positioned on a magnetic surface of either the automobile 10 or the trailer 12 and in the vicinity of the associated coupling hitch assembly 14 or 16 as the case may be. When so positioned, said base is maintained in a relatively secure immobile position by means of a circular magnet 70 which is of disk-like configuration and is countersunk in a circular recess 72 in the bottom face 44 of the base 40.

Although the bores 54 and 58 are illustrated herein as being offset longitudinally in one direction from the medial center plane of the base, while the magnet 70 is shown as being offset in the opposite direction from such center plane, the placement of these bores and the magnet may be varied as desired. The reason for such offset resides in the fact that when the supporting rod 60 is inclined or leans so that it overhangs the end face 52 of the base, the base is stable because the magnetic bond between the magnet 70 and the magnetic surface on which the base is positioned is remote from the end face 50. The base is also stable when the rod 60 is inclined in the other direction because the rod is effectively anchored to the base at a region remote from the end face 52.

In FIGS. 1 and 2 of the drawings, the block 40 which supports the sighting element 32 is shown as being mounted on the upper metal surface of the shelf-like bracket plate 24 of the ball hitch assembly 14, while the block 40 which supports the sighting element 36 is shown as being mounted on the upper metal surface of the yoke 26 of the socket hitch assembly 16. However, under certain circumstances with certain forms of ball hitch and socket hitch assemblies, there may not be presented any metal surfaces of sufficient area for placement of the bases 40 thereon and, in such an instance, it is contemplated that the bases may be operatively placed on any suitable magnetic surfaces of the automobile or trailer bodies where the rods 60 may be adjusted to bring the sighting elements 32 and 36, respectively, to their proper positions of vertical alignment with the ball 18 and socket 20.

From the above description, it is believed that the nature and advantages of the present sighting device or visual guide means will be apparent without further description. It is pointed out, however, that the specific character of the components of the ball hitch and socket hitch assemblies of the automobile and trailer have no bearing upon the character or manner of use of the present sighting device. In FIG. 1 of the drawings, the trailer hitch assembly 14 is shown as being provided with the usual safety chains 80 and with a conventional safety lock mechanism 82, but these and other hitch accessories which may be present have no bearing upon the present sighting device except, possibly, to dictate that the block-like base 40 be positioned on some other metal surface of the trailer 12 than directly on the socket hitch assembly 16. A similar situation may exist in connection with the use of a ball hitch assembly 14 other than the one illustrated herein.

In FIG. 6 of the drawings, there is illustrated a slightly modified form of the invention wherein the nodule-type sight elements 32 and 36 at the upper ends of the two supporting rods 60 have been replaced by special sighting elements 32' and 36'. The sighting element 32' is in the form of a flattened area at the extreme upper end of the rod 60 which is associated with the ball hitch assembly of the towing vehicle, while the sighting element 36' is in the form of a generally triangular plate having a notched upper edge as indicated at 90. The two sighting elements 32' and 36' simulate, respectively, the rear and front barrel sighting elements of a gun, pistol, or similar firearm. The sighting element 32' is disposed in front of the sighting element 36' during automobile maneuvering operations since it is less likely to obstruct a full view of the latter sighting element than if the two elements were positionally reversed. The use of gun-type sighting elements facilitates visual alignment thereof.

The invention is not to be limited to the exact arrangement of parts shown in the accompanying drawings or described in this specification as various changes in the details of construction may be resorted to without departing from the spirit or scope of the invention. For example, whereas the towing vehicle 10 has, for exemplary purposes, been shown in the form of a passenger automobile, such vehicle may be in the form of a truck, a tractor or other automotive vehicle. Similarly, if desired, the towed article may be in the form of a tent-type camping trailer, a merchandise-hauling trailer, a boat rig, or, in fact, any vehicle which is provided with a socket hitch assembly by means of which it may be towed. Therefore, only insofar as the invention is particularly pointed out in the accompanying claims is the same to be limited.

Having thus described the invention What I claim as new and desire to secure by letters patent is:

1. A two-component sighting device adapted to facilitate vertical alignment between a coupling element on a stationary towed vehicle and a coupling element on a movable towing vehicle, said components being adapted for positioning on the respective vehicles and each component comprising a base member of block-like configuration and presenting top, bottom, side and end faces, said base member being formed with a transverse bore therethrough in communication with said side faces and at a region appreciably closer to one end face than to the other end face, a rock shaft rotatably disposed within said bore with a friction fit, said base member being further provided with a vertical bore which opens onto said top face and intersects said tranverse bore in the medial region of the latter, an elongated extensible and contractible supporting rod consisting of telescopic sections having its lower proximate end projecting through said vertical bore and embedded in said rock shaft, the diameter of the proximate end region of the supporting rod being appreciably less than the diameter of said vertical bore whereby the supporting rod is capable of fore and aft swinging movement about the axis of the rock shaft between extreme positions wherein it overhangs the end faces respectively, a permanent magnet embedded in the bottom face of said base member at a region remote from said one end face and relatively close to said other end face and having its pole face substantially flush with said bottom face whereby, when the base member is positioned on a magnetic surface associated with the respective vehicle the component will possess stability in any position of the supporting rod, and a sighting element mounted on the distal end of said supporting rod.

2. A two-component sighting device as set forth in claim 1, wherein the sighting element of one component is in the form of a flat thin plate in the nature of a proximate front part gun sight, and the sighting element of the other component is in the form of a notched member in the nature of a V-notch rear gun sight.

* * * * *